United States Patent
Dong et al.

(10) Patent No.: US 11,419,018 B2
(45) Date of Patent: *Aug. 16, 2022

(54) ANCHOR MANAGEMENT FOR DUAL CONNECTIVITY DEVICES

(71) Applicant: Verizon Patent and Licensing Inc., Basking Ridge, NJ (US)

(72) Inventors: Yuexin Dong, Bridgewater, NJ (US); Jignesh S. Panchal, Hillsborough, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 44 days.

This patent is subject to a terminal disclaimer.

(21) Appl. No.: 16/907,573

(22) Filed: Jun. 22, 2020

(65) Prior Publication Data

US 2020/0322855 A1 Oct. 8, 2020

Related U.S. Application Data

(63) Continuation of application No. 16/143,517, filed on Sep. 27, 2018, now Pat. No. 10,736,003.

(51) Int. Cl.
*H04W 4/00* (2018.01)
*H04W 36/00* (2009.01)
*H04W 76/15* (2018.01)
*H04W 24/10* (2009.01)
*H04W 36/30* (2009.01)
*H04W 76/27* (2018.01)

(52) U.S. Cl.
CPC ....... *H04W 36/0069* (2018.08); *H04W 24/10* (2013.01); *H04W 36/0085* (2018.08); *H04W 36/30* (2013.01); *H04W 76/15* (2018.02); *H04W 76/27* (2018.02)

(58) Field of Classification Search
CPC ..... H04W 36/08; H04W 36/14; H04W 84/12; H04W 36/0022; H04W 24/10; H04W 36/0069; H04W 36/30; H04W 36/0085; H04W 76/27; H04W 76/15
See application file for complete search history.

(56) References Cited

U.S. PATENT DOCUMENTS

2015/0223149 A1* 8/2015 Liu ................. H04W 24/08 370/336
2017/0331577 A1* 11/2017 Parkvall ............... H04B 7/0848
(Continued)

*Primary Examiner* — Atique Ahmed

(57) ABSTRACT

A method may include determining that a user equipment (UE) device is a dual connectivity device capable of communicating via a Fifth Generation (5G) network and a non-5G network. The method may also include receiving, a radio resource control (RRC) connection request, establishing an RRC connection with the UE device and determining whether the first wireless station is a dual connectivity wireless station. The method may further include initiating, in response to determining that the first wireless station is not a dual connectivity wireless station, a handover of a wireless connection to the UE device from the first wireless station to a second wireless station that is a dual connectivity wireless station, or identifying, in response to determining that the first wireless station is a dual connectivity wireless station, a 5G wireless station in the 5G network to act as a serving cell for the UE device.

20 Claims, 8 Drawing Sheets

(56) References Cited

U.S. PATENT DOCUMENTS

| | | | |
|---|---|---|---|
| 2018/0092085 A1* | 3/2018 | Shaheen | H04W 76/16 |
| 2018/0324742 A1* | 11/2018 | Agarwal | H04W 48/16 |
| 2019/0037417 A1* | 1/2019 | Lei | H04W 36/0069 |
| 2019/0174363 A1* | 6/2019 | Tsuda | H04W 36/00837 |
| 2019/0174481 A1* | 6/2019 | Wei | H04B 7/024 |
| 2019/0182732 A1* | 6/2019 | Wei | H04W 36/0069 |
| 2021/0100063 A1* | 4/2021 | Sharma | H04W 80/02 |

* cited by examiner

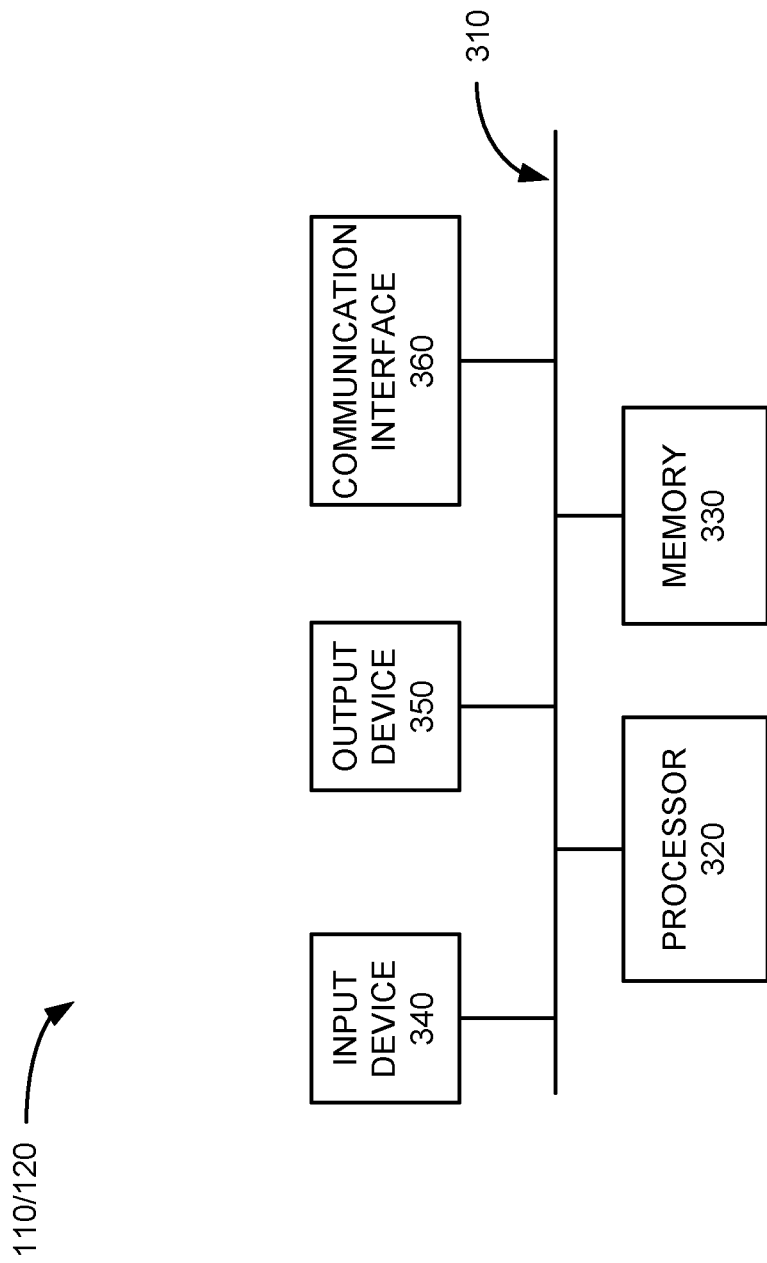

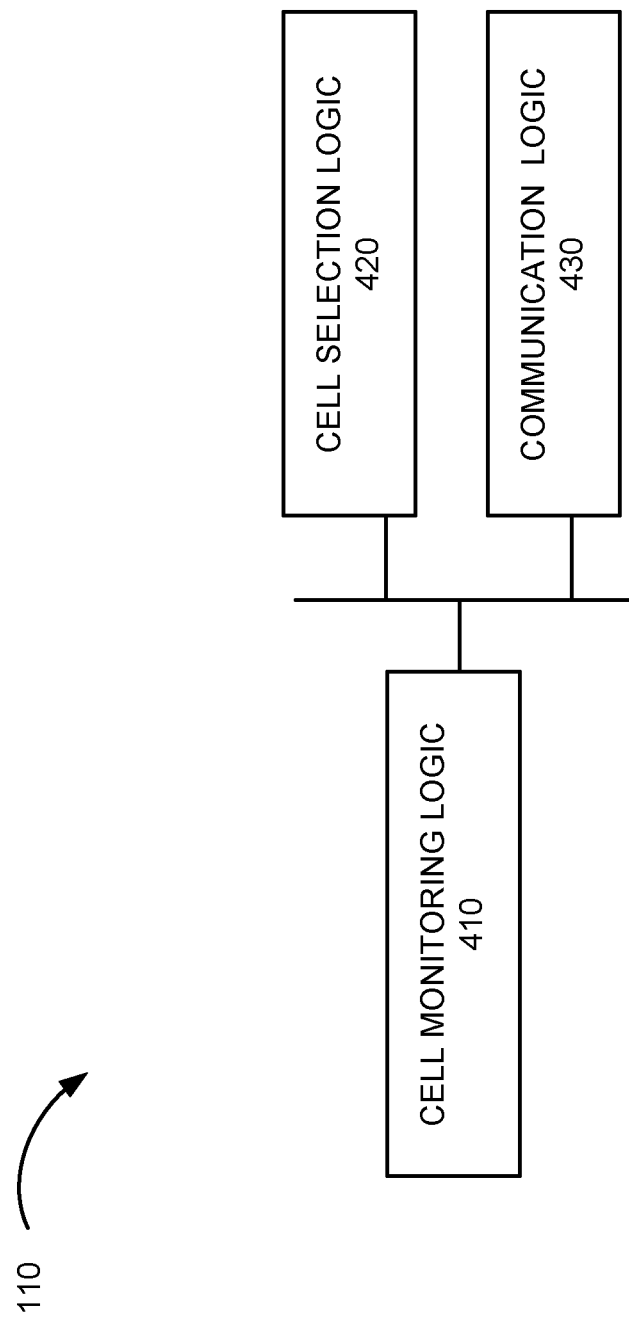

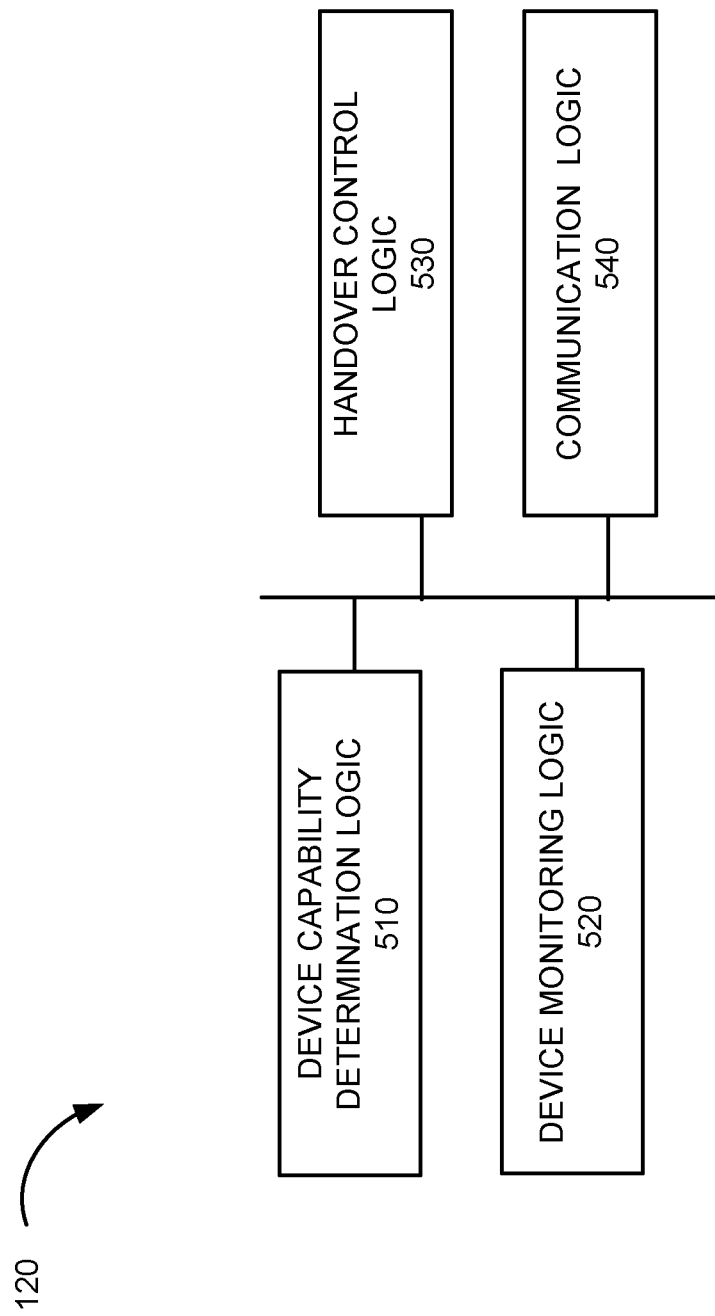

ANCHOR MANAGEMENT FOR DUAL CONNECTIVITY DEVICES

RELATED APPLICATION

This application is a continuation of application Ser. No. 16/143,517, entitled "Anchor Management for Dual Connectivity Devices" and filed Sep. 27, 2018, the contents of which are hereby incorporated by reference herein.

BACKGROUND INFORMATION

User devices associated with a Fifth Generation (5G) New Radio (NR) system may have the capability to communicate via a 5G network, as well as communicate via other networks, such as a Long Term Evolution (LTE) based network. For example, an Evolved Universal Terrestrial Radio Access New Radio Dual Connectivity (EN-DC) device has the capability to exchange data with an LTE base station (e.g., an eNode B), as well as exchange data with a 5G next generation base station (e.g., a gNode B).

However, when connecting to a base station, an EN-DC device may connect to a particular base station that does not support 5G communications and/or is unable to initiate a handover from a non-5G system to a 5G system. For example, a service area associated with a particular service provider is typically covered by multiple cells operating with different frequency bands. A user device may select an LTE cell/band based on the signal strength of transmitters within the service area. As a result, the user device that is capable of communicating via a 5G network (e.g., an EN-DC device) may select a cell that is not configured to support 5G communications and/or is unable to initiate a handover to a 5G base station. Such a selection may result in the user device being unable to communicate via 5G.

BRIEF DESCRIPTION OF THE DRAWINGS

FIG. 3 illustrates an exemplary configuration of logic components included in one or more of the devices of FIG. 1;

FIG. 4 illustrates an exemplary configuration of logic components implemented in the user equipment device of FIG. 1;

FIG. 5 illustrates an exemplary configuration of logic components implemented in a wireless station of FIG. 1.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to providing 5G service for an EN-DC device in an efficient manner. For example, in one implementations, an EN-DC device may communicate with one or more base stations to allow the EN-DC device to connect to an "anchor cell" associated with, for example, an LTE network. The term anchor cell, as used herein (also referred to herein as LTE anchor cell, EN-DC anchor cell or EN-DC cell), refers a cell or sector associated with a wireless station or node that supports communications via both a non-5G network (e.g., an LTE network) and a 5G network. For example, the anchor cell may communicate in accordance with LTE requirements and also be configured to communicate in accordance with 5G requirements to initiate a handover to the 5G base station when the user device is located in an area supporting 5G communications. The EN-DC device may form a connection with the anchor cell, and then connect with a 5G cell to allow the EN-DC device to communicate via 5G. In this manner, once the EN-DC device moves into an area where 5G coverage is available, the EN-DC device may be transitioned from an LTE base station to a base station supporting 5G communications.

Systems and methods described herein are also transparent to user devices operating in accordance with LTE and 5G NR protocols/standards. That is, no additional features or functionality are needed for EN-DC devices to take advantage of 5G services offered by a service provider. In addition, systems and methods described herein provide for connecting a user device (e.g., an EN-DC device) to a 5G network regardless of whether the user device is in an idle state or a connected state. Still further, implementations described herein minimize signaling between the user device and the wireless stations, thereby reducing network traffic and avoiding signaling problems, such as a signaling storm, in either an LTE network or 5G network when transitioning a communication session from an LTE network to a 5G network.

Figure 1:
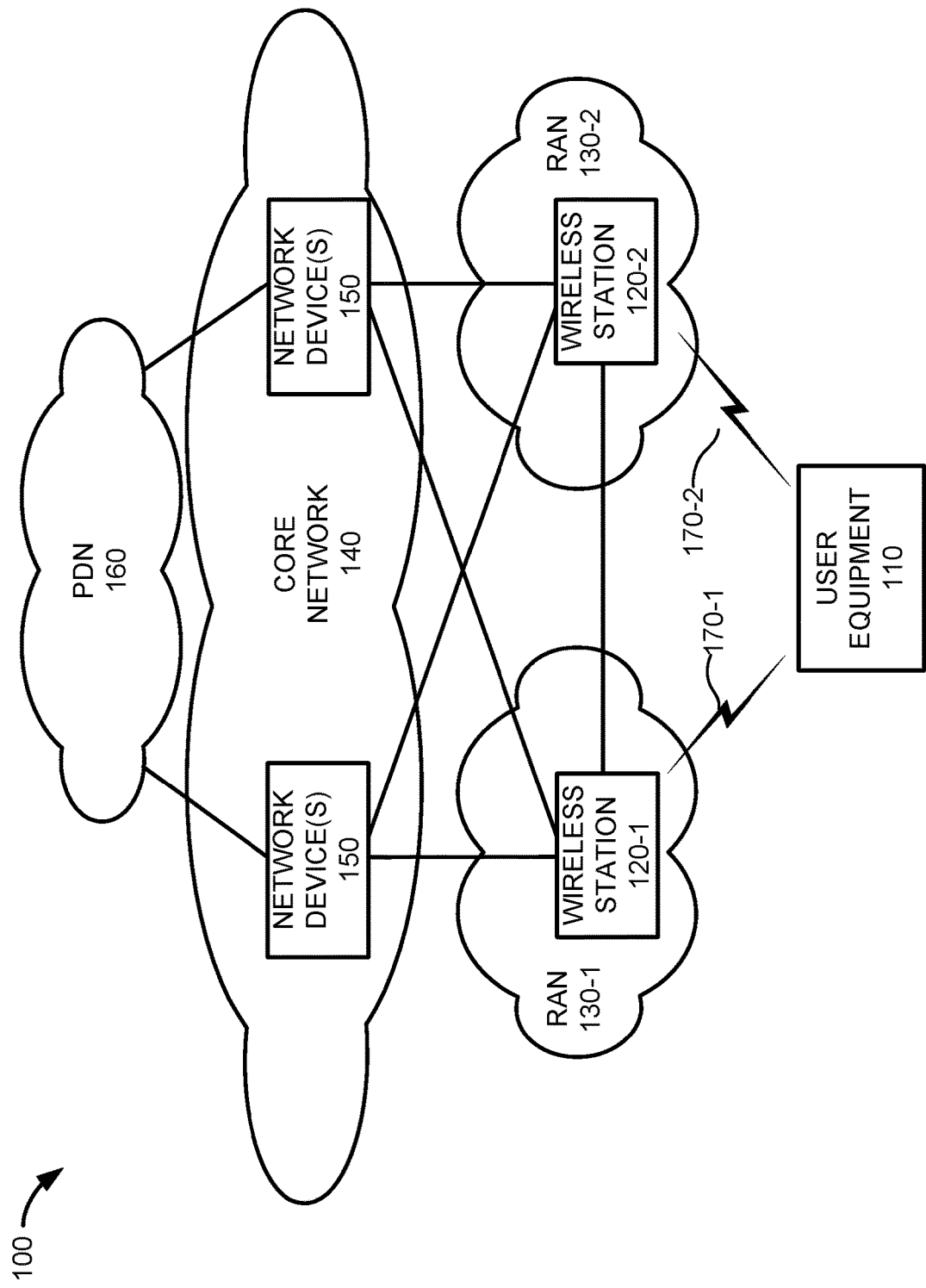
FIG. 1 illustrates an exemplary environment in which systems and methods described herein may be implemented.

FIG. 1 is a diagram of an exemplary environment 100 in which the systems and methods described herein may be implemented. Referring to FIG. 1, environment 100 includes user equipment (UE) 110, wireless station 120-1 associated with radio access network (RAN) 130-1, wireless station 120-2 associated with RAN 130-2, core network 140 with network devices 150, and packet data network (PDN) 160. Wireless stations 120-1 and 120-2 may be referred to herein collectively as wireless stations 120 and individually as wireless station 120 or 120-X, and RANs 130-1 and 130-2 may be referred to herein collectively as RANs 130 and individually as RAN 130 or 130-X. In other embodiments, environment 100 may include additional networks, fewer networks, and/or different types of networks than those illustrated and described herein.

Environment 100 includes links between the networks and between the devices. For example, environment 100 may include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

In the configuration illustrated in FIG. 1, UE 110 may use wireless channels 170-1 and 170-2 (referred to collectively as wireless channels 170) to access wireless stations 120-1 and 120-2, respectively. Wireless channels 170 may correspond, for example, to a physical layer in accordance with different radio access technology (RAT) types. For example, wireless channel 170-1 may correspond to the physical layer associated with 4G or 4.5G RAN standards (e.g., 3GPP standards for 4G and 4.5G air interfaces, collectively referred to herein as "4G"), while wireless channel 170-2 may correspond to the physical layer associated with 5G New Radio standards (e.g., 3GPP standards for 5G air interfaces).

UE 110 (also referred to herein as UE device 110 or user device 110), may include any type of mobile device having multiple coverage mode capabilities (e.g., EN-DC capabilities) and is able to communicate with different wireless stations (e.g., wireless stations 120) using different wireless channels (e.g., channels 170) corresponding to different RANs (e.g., RANs 130-1 and 130-2). UE 110 may be a mobile device that may include, for example, a cellular radiotelephone, a smart phone, a tablet, any type of internet protocol (IP) communications device, a Voice over Internet Protocol (VoIP) device, a personal computer (PC), a laptop computer, a notebook, a netbook, a wearable computer (e.g., a wrist watch, eye glasses, etc.), a gaming device, a media playing device, a digital camera that includes communication capabilities (e.g., wireless communication mechanisms such as Wi-Fi), etc. In other implementation, UE 110 may be implemented as a machine-type communications (MTC) device, an Internet of Things (IoT) device, a machine-to-machine (M2M) device, etc.

UE 110 may connect to RANs 130 and other devices in environment 100 via any conventional technique, such as wired, wireless, optical connections or a combination of these techniques. UE 110 and the person associated with UE 110 (e.g., the party holding or using UE 110) may be referred to collectively as UE 110 in the description below.

According to implementations described herein, UE 110 may be provisioned (e.g., via a subscriber identity module (SIM) card or another secure element) to recognize particular network identifiers (e.g., associated with RANs 130) and to support particular radio frequency (RF) spectrum ranges.

Wireless stations 120 may each include a network device that has computational and wireless communication capabilities. Wireless stations 120 may each include a transceiver system that connects UE device 110 to other components of RAN 130 and core network 140 using wireless/wired interfaces. Wireless stations 120 may be implemented as a base station (BS), a base transceiver station (BTS), a Node B, an evolved Node B (eNode B), an evolved LTE (eLTE) eNB, a next generation Node B (gNode B), a remote radio head (RRH), an RRH and a baseband unit (BBU), a BBU, or other type of wireless node (e.g., a picocell node, a femtocell node, a microcell node, etc.) that provides wireless access to one of RANs 130. Each wireless station 120 may support a RAN 130 having different RAT types. For example, in one implementation, RAN 130-1 may include an E-UTRAN for an LTE network, while RAN 130-2 may include a 5G NR RAN as well as an E-UTRAN for an LTE network. For example, RAN 130-2 may be configured to support communications via both LTE and 5G networks.

Core network 140 may include one or multiple networks of one or multiple types. For example, core network 140 may be implemented to include a terrestrial network and/or a satellite network. According to an exemplary implementation, core network 140 includes a network pertaining to multiple RANs 130. For example, core network 140 may include the core part of an LTE network, an LTE-Advanced network, a 5G network, a legacy network, etc.

Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), a PDN gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140.

PDN 160 may include one or more networks, such as a local area network (LAN), a wide area network (WAN), a metropolitan area network (MAN), a telephone network, the Internet, etc., capable of communicating with UE 110. In one implementation, PDN 160 includes a network that provides data services (e.g., via packets or any other Internet protocol (IP) datagrams) to user device 110.

The number and arrangement of devices in environment 100 are exemplary. According to other embodiments, environment 100 may include additional devices (e.g., thousands of UE 110s, hundreds of wireless stations 120, dozens of RANs, etc.) and/or differently arranged devices, than those illustrated in FIG. 1.

As described above, in an exemplary implementation, UE 110 is an EN-DC device capable of communicating via a 4G network (e.g., an LTE network) or 4.5G network, as well as via a 5G network. In conventional systems based on current standards, UE 110 may connect to a cell based on the signal strengths of the particular base stations. Such a cell, however, may not support 5G communications.

Figure 2A:
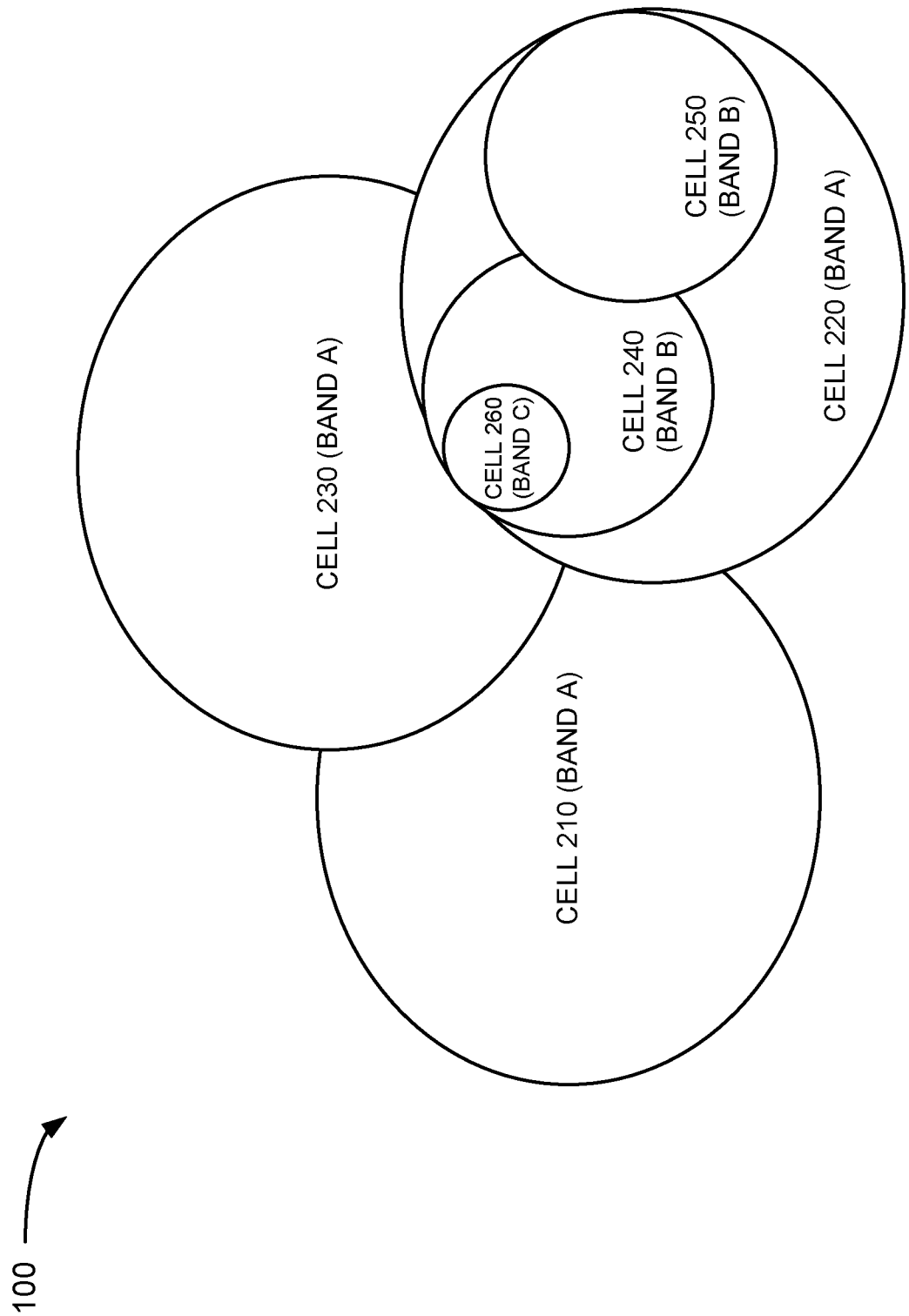
FIGS. 2A and 2B illustrate exemplary cell coverage areas in a portion of the environment of FIG. 1.

For example, FIG. 2A illustrates a portion of environment 100 associated with one or more RANs 130 that include cells that operate in different frequency bands. Referring to FIG. 2A, environment 100 includes cells 210, 220, 230, 240, 250 and 260.

Each of cells 210-260 may correspond to a particular coverage supported by a particular wireless station 120. In an exemplary implementation, cells 210, 220 and 230 may each correspond to LTE-based cells having a relatively large coverage area supporting LTE communications devices that operate in a particular frequency, illustrated as band A. Each of cells 240 and 250 may correspond to LTE-based cells that have a smaller coverage area than cells 210-230 and that operate in a different frequency band than cells 210-230, illustrated as band B. In an exemplary implementation, cell 260 correspond to a 5G NR cell that has a smaller coverage area than cells 210-250 and operates in a different frequency band than cells 210-250, illustrated as band C.

In this example, assume that cell 240 corresponds to an LTE anchor cell that includes a base station 120 that is able to communicate in accordance with both LTE and 5G protocols/standards. As described above, in an exemplary implementation, UE 110 can connect to any of cells 210-260. However, if UE 110 connects to a non-anchor cell, such as one of cells 210-230 or 250 based on, for example, signal strength of an eNode B in the particular cell, UE 110 may not be able to communicate via 5G.

Figure 2B:
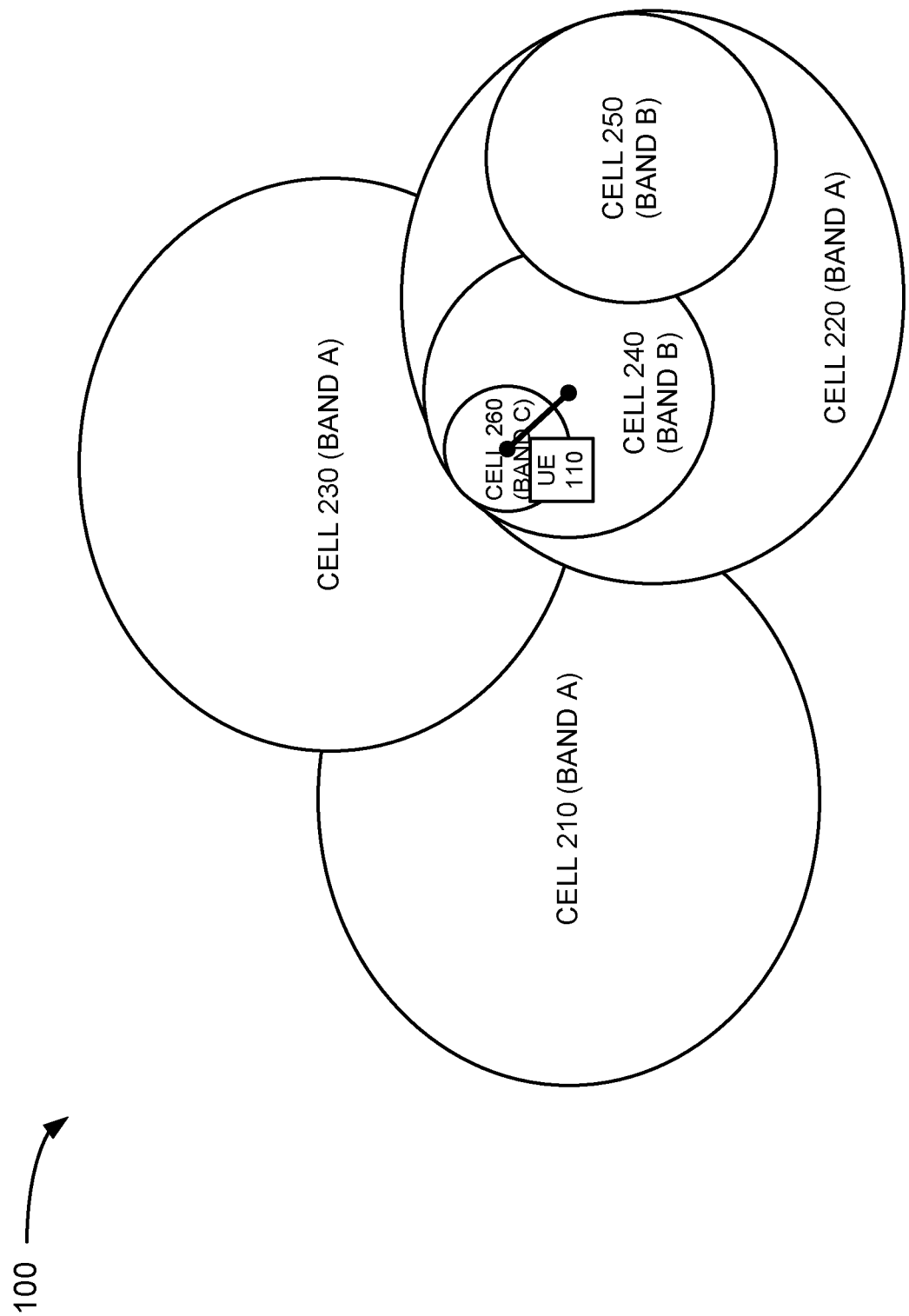

For example, referring to FIG. 2B, assume that UE 110 is located in an area that is covered by cell 260, which in this example is a 5G NR cell. As illustrated in FIG. 2B, cells 220 and 240 also cover the area in which UE 110 is located. In this scenario, UE 110 may connect to a wireless station 120 associated with cell 220 based on for example, 3GPP idle mode selection criteria. However, in this example, cell 220 is a non-anchor cell that is unable to communicate via 5G and/or is unable to initiate a handover to a 5G base station, while cell 240 is an anchor cell. Therefore, if UE 110 connects to cell 220, as opposed to cell 240 based on the signal strengths (e.g., the signal strength of a wireless station associated with cell 220 is greater than the signal strength of a wireless station associated with cell 240), UE 110 may be unable to communicate via 5G when UE 110 is located within the area illustrated in FIG. 2B (i.e., within cell 260 in which 5G service is available). In accordance with implementations described herein, UE 110 connects to an anchor cell or transitions to an anchor cell when such a connection is available. Connecting to an anchor cell may then facilitate transitioning to 5G service when UE 110 is located in an area where 5G service is available, as described in detail below.

FIG. 3 illustrates an exemplary configuration of UE 110. Other devices in environment 100, such as wireless stations 120, network devices 150 and elements in PDN 160 may be configured in a similar manner. Referring to FIG. 3, UE 110 may include bus 310, processor 320, memory 330, input device 340, output device 350 and communication interface 360. Bus 310 may include a path that permits communication among the elements of UE 110.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to UE 110, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that user device 110 (or wireless station 120) uses to communicate with other devices via wired, wireless or optical mechanisms. For example, communication interface 360 may include one or more radio frequency (RF) transmitters, receivers and/or transceivers and one or more antennas for transmitting and receiving RF data via links 170. Communication interface 360 may also include a modem or an Ethernet interface to a LAN or other mechanisms for communicating with elements in a network, such as RAN 130 or another network.

The exemplary configuration illustrated in FIG. 3 is provided for simplicity. It should be understood that user device 110 (or wireless station 120) may include more or fewer devices than illustrated in FIG. 3. In an exemplary implementation, UE 110 (or wireless station 120) perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

FIG. 4 is an exemplary functional block diagram of components implemented in UE 110. In an exemplary implementation, all or some of the components illustrated in FIG. 4 may be implemented by processor 320 executing software instructions stored in memory 330. In other implementations, all or some of the components illustrated in FIG. 4 may be implemented in hardware or a combination of hardware, firmware and software used to perform the functionality described below.

UE 110 may include cell monitoring logic 410, cell selection logic 420 and communication logic 430. In alternative implementations, these components or a portion of these components may be located externally with respect to UE 110.

Cell monitoring logic 410 may include logic to measure and/or monitor the signal strengths associated with particular cells. For example, UE 110 illustrated in FIG. 2B may measure the strength of communication signals from wireless stations 120 associated with one or more of cells 210-260.

Cell selection logic 420 may include logic to select a cell, such as an anchor cell or non-anchor cell in environment 100. For example, UE 110 illustrated in FIG. 2B may establish communications with a wireless station associated with cell 240 (e.g., an anchor cell in this example) to facilitate communications via a 5G NR cell, such as cell 260. For example, selecting a cell which corresponds to an anchor cell may allow that anchor cell to handoff communications to a gNode B or other device associated with communications via 5G NR cell 260 when UE 110 is located within an area defined by NR cell 260, as described in detail below. In other instances, cell selection logic 420 may select a non-anchor cell with which to connect when an anchor cell is not available. The non-anchor cell may then handover communications to an anchor cell, as described in detail below.

Communication logic 430 may include logic to communicate with elements in environment 100 directly or indirectly. For example, communication logic 430 may transmit and receive communications associated with establishing a radio resource control (RRC) connection with the appropriate wireless stations 120 in environment 100, such as an eNode B associated with an LTE cell. Communication logic 430 may also transmit and receive communications associated with establishing a connection with a gNode B associated with a 5G NR cell.

Although FIG. 4 shows exemplary components of UE 110, in other implementations, UE 110 may include fewer components, different components, differently arranged components, or additional components than depicted in FIG. 4. In addition, functions described as being performed by one of the components in FIG. 4 may alternatively be performed by another one or more of the components of UE 110.

FIG. 5 is an exemplary functional block diagram of components implemented in wireless station 120. In an exemplary implementation, all or some of the components illustrated in FIG. 5 may be implemented by processor 320 executing software instructions stored in memory 330. In other implementations, all or some of the components illustrated in FIG. 5 may be implemented in hardware or a combination of hardware, firmware and/or software used to perform the functionality described below.

Wireless station 120 may include device capability determination logic 510, device monitoring logic 520, handover control logic 530 and communication logic 540. In alternative implementations, these components or a portion of these components may be located externally with respect to wireless station 120.

Device capability logic 510 may include logic to identify whether a particular UE 110 is an EN-DC device, or a 4G device that is not capable of communicating via a 5G network. For example, device capability logic 510 may receive information from UE device 110 and determine whether the device is an EN-DC device based on the received information.

Device monitoring logic 520 may include logic to determine the state of a particular UE 110. For example, device monitoring logic 520 may determine whether UE 110 is in an idle state, a connected state, transitioning from an idle state to a connected state, or in another state.

Handover control logic 530 may include logic to facilitate a handover associated with communications from one cell to another cell. For example, handover control logic 530 may handover communications from one LTE cell (e.g., a non-EN-DC cell) to another LTE cell (e.g., an EN-DC anchor cell). Handover control logic 530 may also handover communications from an EN-DC cell (i.e., an anchor cell) to a 5G NR cell. For example, if UE 110 is located in an area supporting 5G communications, such as within cell 260 illustrated in FIG. 2B, handover control logic 530 may transition or handoff communications associated with the LTE network to a wireless station in the 5G network. The term "handover" as used herein (also referred to herein as "handoff") should be broadly construed as the process of transferring an ongoing data session from one cell or channel to another cell or channel while the data session is occurring and without the loss or interruption of service.

Communication logic 540 may include logic to communicate with elements in environment 100 directly or indirectly. For example, communication logic 540 may communicate with UE 110 to establish an RRC connection. Communication logic 540 may also initiate communications with another cell, such as another LTE cell and/or a 5G cell to allow an EN-DC UE 110 to communicate via a 5G network, as described in detail below.

Figure 6:
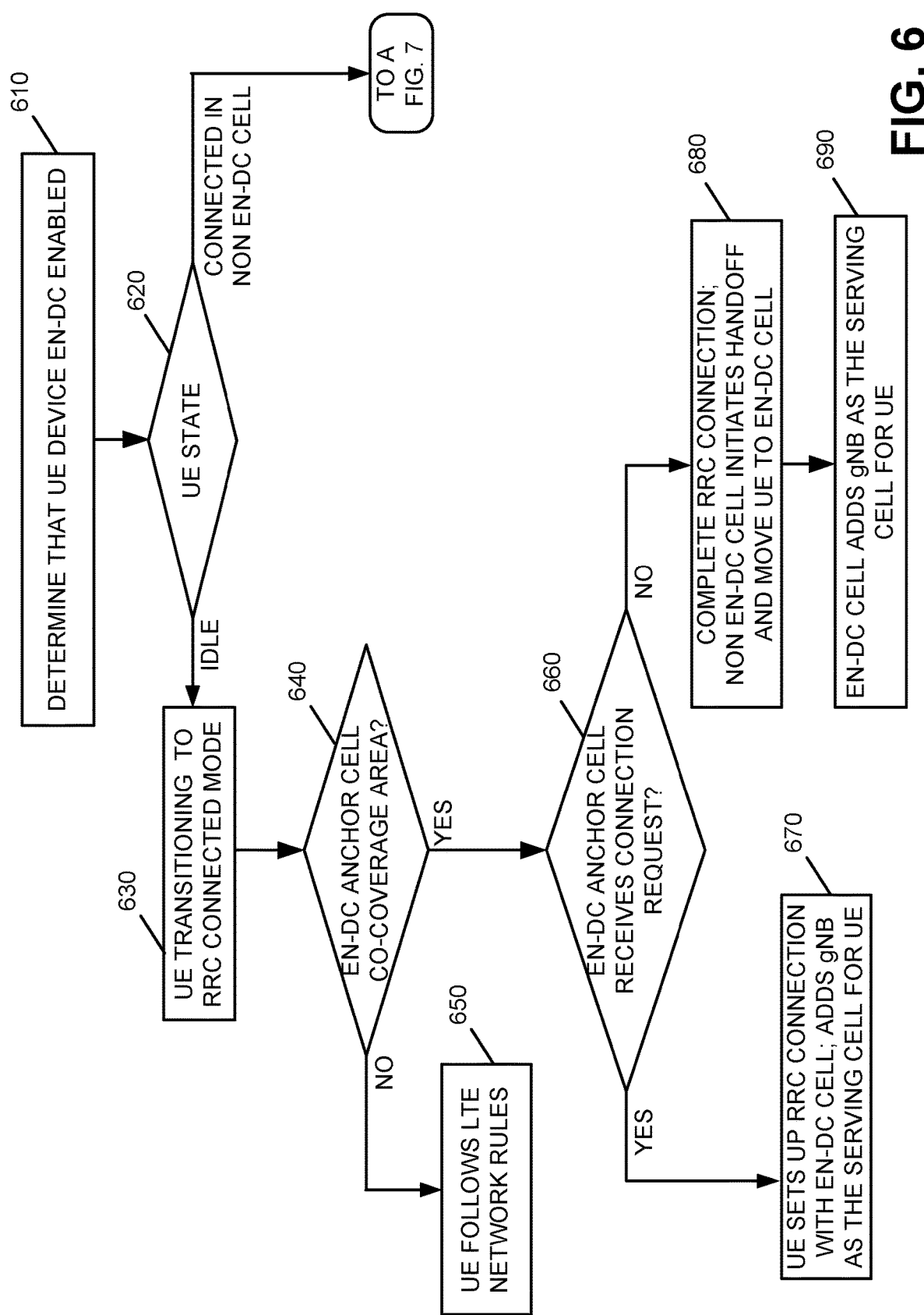
FIGS. 6 and 7 are flow diagrams illustrating processing by various components in the environment of FIG. 1 in accordance with an exemplary implementation.
Figure 7:
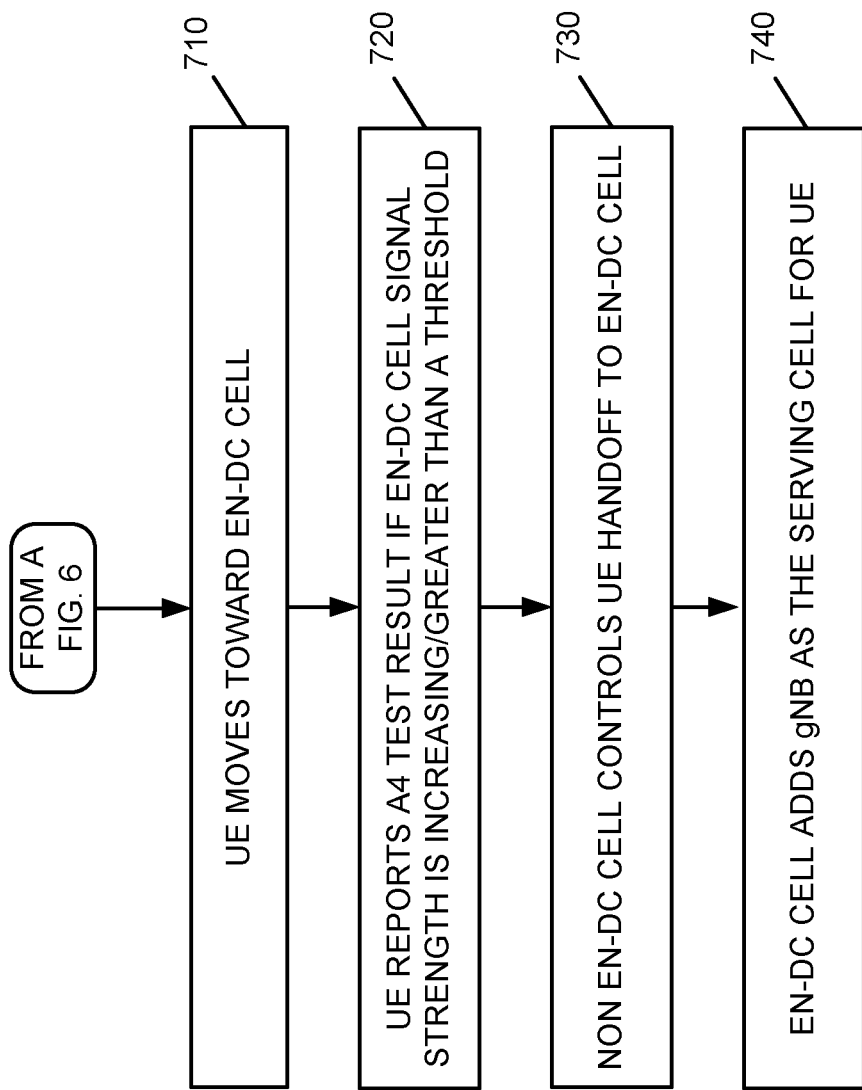

FIGS. 6-7 are flow diagrams illustrating exemplary processing associated with user device 110 connecting to an anchor cell and establishing connections with a 5G NR cell. Processing may begin with a wireless station 120 determining that UE 110 is EN-DC enabled (block 610). For example, during communications with a wireless station 120, UE 110 may transmit information identifying capabilities associated with UE 110, including information indicating whether UE 110 is an EN-DC enabled device. In this case, assume that UE 110 provides information to wireless stations 120-1 and/or 120-2 indicating that UE 110 is EN-DC enabled. Device capability determination logic 510 receives the information from UE 110 and determines that UE 110 is EN-DC enabled.

Wireless station 120 may be configured to facilitate a connection from UE 110 to an anchor cell regardless of whether UE 110 is in an idle state or a connected state. For example, assume that UE 110 is in an idle state (block 620—idle). In some implementations, device monitoring logic 520 may determine the state of UE 110, such as whether UE 110 is in an idle mode or a connected mode based on, for example, responses or lack of responses to one or more broadcast messages transmitted by wireless station 120 to UE 110 and other UEs 110. In any event, assume that UE 110 is in an idle mode/state. Further assume that UE 110 is in the process of transitioning to a radio resource control (RRC) connected mode based on the user of UE 110 initiating a data session to send or receive data (block 630). For example, UE 110 may be attempting to transmit and/or receive data via core network 140.

Wireless station 120 may then determine if the current location of UE 110 corresponds to the location of an EN-DC anchor cell having co-coverage areas for both LTE and 5G communications (block 640). For example, wireless station 120-1 may determine that wireless station 120-1 is not located within an EN-DC anchor cell having co-coverage for both LTE and 5G communications (block 640—no). For example, wireless station 120-1 may be associated with cell 250 (FIG. 2B), which does not correspond to an EN-DC anchor cell in this example. In this scenario, UE 110 connects with wireless station 120-1 and UE 110 follows the current rules established in that particular cell, such as LTE rules and protocols and communicates in accordance with LTE requirements (block 650). UE 110 may move at a later time and attempt to establish communications with an LTE anchor cell and/or 5G NR cell.

If, however, UE 110 is located within an EN-DC anchor cell having co-coverage area for both LTE and 5G communications (block 640—yes), the wireless station 120 that receives the RRC connection request determines whether that wireless station 120 is an anchor cell in environment 100 (block 660). For example, assume that UE 110 is located in cell 260 as shown in FIG. 2B. In this example, assume that wireless station 120-2 associated with cell 240 received the RRC connection request. Wireless station 120-2 may then determine that it is an EN-DC anchor cell (block 660—yes). In this scenario, wireless station 120-2 sets up an RRC connection with UE 110 (block 670). Wireless station 120-2 may also add or designate the gNode B associated with cell 260 as the serving cell (Scell) for UE 110. Wireless station 120-2 may then handover communications associated with UE 110 to the gNode B associated with cell 260, as indicated by the line from cell 240 to cell 260 in FIG. 2B. UE 110 may then communicate with other devices in environment 100 in accordance with a 5G protocol.

If, however, the cell that received the RRC request is not an EN-DC anchor cell in environment 100 (block 660—no), wireless station 120 completes the RRC connection (block 680). For example, if a wireless station 120 associated with cell 220 received the RRC connection request, that wireless station 120 completes the RRC connection. After completing the RRC connection with UE 110, wireless station 120 initiates a handoff of the connection with UE 110 to an EN-DC cell to move UE 110 to the EN-DC cell (block 680). For example, wireless station 120 associated with cell 220 in this example, initiates a handoff of the connection with UE 110 to the wireless station 120 associated with cell 240. Once the handoff to wireless station 120-2 is completed, wireless station 120-2 may then add or designate the gNode B associated with cell 260 as the serving cell (Scell) for UE 110 (block 690). Wireless station 120-2 may then handoff communications to the 5G cell, as indicated by the line connecting cells 240 and 260 illustrated in FIG. 2B. In this manner, UE 110 can then communicate via a 5G protocol once UE 110 is located in an area that supports 5G communications.

Referring back to block 620, assume that UE is in a connected state, but connected to a non-EN-DC cell. For example, device monitoring logic 520 of wireless station 120 may determine that UE 110 is in a connected state, but connected to a non-EN-DC cell (i.e., the wireless station to which UE 110 is connected is not an anchor cell). In this case, UE 110 may move toward an EN-DC cell (FIG. 7, 710). For example, UE 110 may move to a coverage area associated with an anchor cell. In other instances, wireless station 120 may attempt to locate an EN-DC anchor cell to which wireless station 120 may handover the connection. In this example, assume that UE 110 is moving. While moving, UE 110 may determine a neighboring cell's signal strength. For example, cell monitoring logic 410 of UE 110 may measure the signal strength of neighbor cell, such as a cell adjacent the current cell with which UE 110 is connected. Cell monitoring logic 410 may trigger a measurement report, such as an LTE A4 measurement report, when the signal strength of a wireless station 120 associated with the neighbor cell is increasing and/or becomes greater than a threshold level (block 720). If the currently connected wireless station 120 determines that the neighbor cell is an EN-DC cell and that the signal strength of the EN-DC cell is greater than the threshold level, the wireless station 120 for the non-EN-DC cell may then control the handoff of the connection with UE 110 to the neighboring EN-DC cell in which the signal threshold is greater than the threshold level (block 730). For example, a wireless station 120 associated with cell 250 may handoff communications with UE 110 to wireless station 120-2, which in this example, is an EN-DC cell in which the signal strength is greater than the threshold level. Wireless station 120-2 may then add or designate the gNode B associated with cell 260 as the serving cell for UE 110 (block 740). In this manner, UE 110 may then communicate via a 5G protocol once UE 110 is located in an area that supports 5G communications.

Implementations described herein provide for 5G service for an EN-DC device by connecting a user device, such as UE 110, with an anchor cell prior to connecting the user device to a 5G node/wireless station. When an EN-DC user device is located in an area supporting 5G communications, an EN-DC anchor cell may handover communications to the 5G node. In addition, implementations described herein do not require changes to the functionality or operations of existing user devices communicating via LTE or newer user devices that are EN-DC devices. That is, the RAN infrastructure is able to transition an EN-DC device that may be in an idle state or a connected state to a 5G node/wireless station in a manner that is transparent to the user device. As a result, user devices can take advantage of 5G services when the user devices are located in an area where 5G services are available.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to an EN-DC device communicating with both a 4G network and a 5G network when the 5G network is available. In other implementations, anchor management may be provided in a manner consistent with the description above to allow a dual connectivity device to communicate with other types of networks to take advantage of newer and/or more advanced networks when such networks are provisioned by a service provider.

Further, while series of acts have been described with respect to FIGS. 6 and 7, the order of the acts and signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   determining, by a first wireless station, that a user equipment (UE) device is a dual connectivity device capable of communicating via a first network and a second network, wherein the first network and second network operate in accordance with different communication protocols or standards;
   receiving, by the first wireless station and from the UE device, a connection request;
   establishing, by the first wireless station, a connection with the UE device; and
   one of:
      initiating, by the first wireless station and in response to determining by the first wireless station that the first wireless station is not a dual connectivity wireless station, a handover of a wireless connection to the UE device from the first wireless station to a second wireless station that is a dual connectivity wireless station configured to communicate via both the first network and the second network, or
      identifying, by the first wireless station and in response to determining that the first wireless station is a dual connectivity wireless station, a third wireless station in the first network to act as a serving cell for the UE device.

2. The method of claim 1, further comprising:
determining, by the first wireless station, that the first wireless station is not a dual connectivity wireless station; and
receiving, by the first wireless station and from the UE device, information indicating a signal strength associated with the second wireless station.

3. The method of claim 2, further comprising:
initiating the handover to the second wireless station in response to determining that the signal strength associated with the second wireless station is greater than a threshold value.

4. The method of claim 3, further comprising:
identifying, by the second wireless station, a wireless station in the first network to act as the serving cell for the UE device; and
initiating, by the second wireless station, a second handover to the identified wireless station in the first network.

5. The method of claim 1, wherein the first network comprises a Fifth Generation (5G) network, the method further comprising:
initiating the handover of the wireless connection from the first wireless station to the second wireless station; and
initiating a second handover from the second wireless station to a 5G wireless station in the 5G network.

6. The method of claim 1, further comprising:
identifying the third wireless station in the first network to act as the serving cell for the UE device; and
initiating a handover for communications associated with the UE device from the first wireless station to the third wireless station.

7. The method of claim 6, further comprising:
transmitting, by the third wireless station, data to the UE device in accordance with a Fifth Generation (5G) protocol or standard.

8. The method of claim 1, wherein the initiating comprises:
initiating, by the first wireless station, the handover to the second wireless station after a radio resource control (RRC) connection is established with the UE device.

9. The method of claim 1, wherein the first network comprises a 5G network and the second network comprises a non-5G network.

10. A system, comprising:
at least one wireless station configured to:
determine that a user equipment (UE) device is a dual connectivity device capable of communicating via a first network and a second network, wherein the first and second networks operate in accordance with different communication protocols or standards;
establish, by a first one of the least one wireless station, a connection with the UE device; and
one of:
initiate, when the first wireless station is not a dual connectivity wireless station, a handover of a wireless connection to the UE device from the first wireless station to a second one of the at least one wireless station that is a dual connectivity wireless station configured to communicate via both the first network and the second network, or
identify, when the first wireless station is a dual connectivity wireless station, a third one of the at least one wireless station in the first network to act as a serving cell for the UE device.

11. The system of claim 10, wherein the first wireless station is configured to:
determine that the first wireless station is not a dual connectivity wireless station; and
receive from the UE device, information indicating a signal strength associated with the second wireless station.

12. The system of claim 11, wherein the first wireless station is further configured to:
initiate the handover to the second wireless station in response to determining that the signal strength associated with the second wireless station is greater than a threshold value.

13. The system of claim 12, wherein the second wireless station is configured to:
identify a wireless station in the first network to act as a serving cell for the UE device; and
initiate a second handover to the identified wireless station in the first network.

14. The system of claim 10, wherein the second wireless station is further configured to:
identify a wireless station in the first network to act as the serving cell for the UE device; and
initiate a second handover to the identified wireless station in the first network.

15. The system of claim 10, wherein the at least one wireless station is configured to:
initiate the handover of the wireless connection from the first wireless station to the second wireless station; and
initiate a second handover from the second wireless station to a wireless station in the first network.

16. The system of claim 10, wherein the at least one wireless station is configured to:
identify the third wireless station in the first network to act as the serving cell for the UE device; and
initiate a second handover for communications associated with the UE device from the first wireless station to the third wireless station.

17. The system of claim 10, wherein the first network comprises a Fifth Generation (5G) network and the second network comprises a non-5G network.

18. A non-transitory computer-readable medium for storing instructions which, when executed by at least one processor associated with a first wireless station, cause the at least one processor to:
determine that a user equipment (UE) device is a dual connectivity device capable of communicating via a first network and a second network, wherein the first and second networks operate in accordance with different communication protocols or standards; and
one of:
initiate, when the first wireless station is not a dual connectivity wireless station, a handover of a wireless connection to the UE device from the first wireless station to a second wireless station that is a dual connectivity wireless station configured to communicate via both the first network and the second network, or
identify, when the first wireless station is a dual connectivity wireless station, a third wireless station in the first network to act as a serving cell for the UE device.

19. The non-transitory computer-readable medium of claim 18, wherein the instructions cause the at least one processor to:

initiate the handover of the wireless connection from the first wireless station to the second wireless station.

20. The non-transitory computer-readable medium of claim 18, wherein the first network operates in accordance with a Fifth Generation (5G) protocol.

* * * * *